United States Patent Office 3,775,527
Patented Nov. 27, 1973

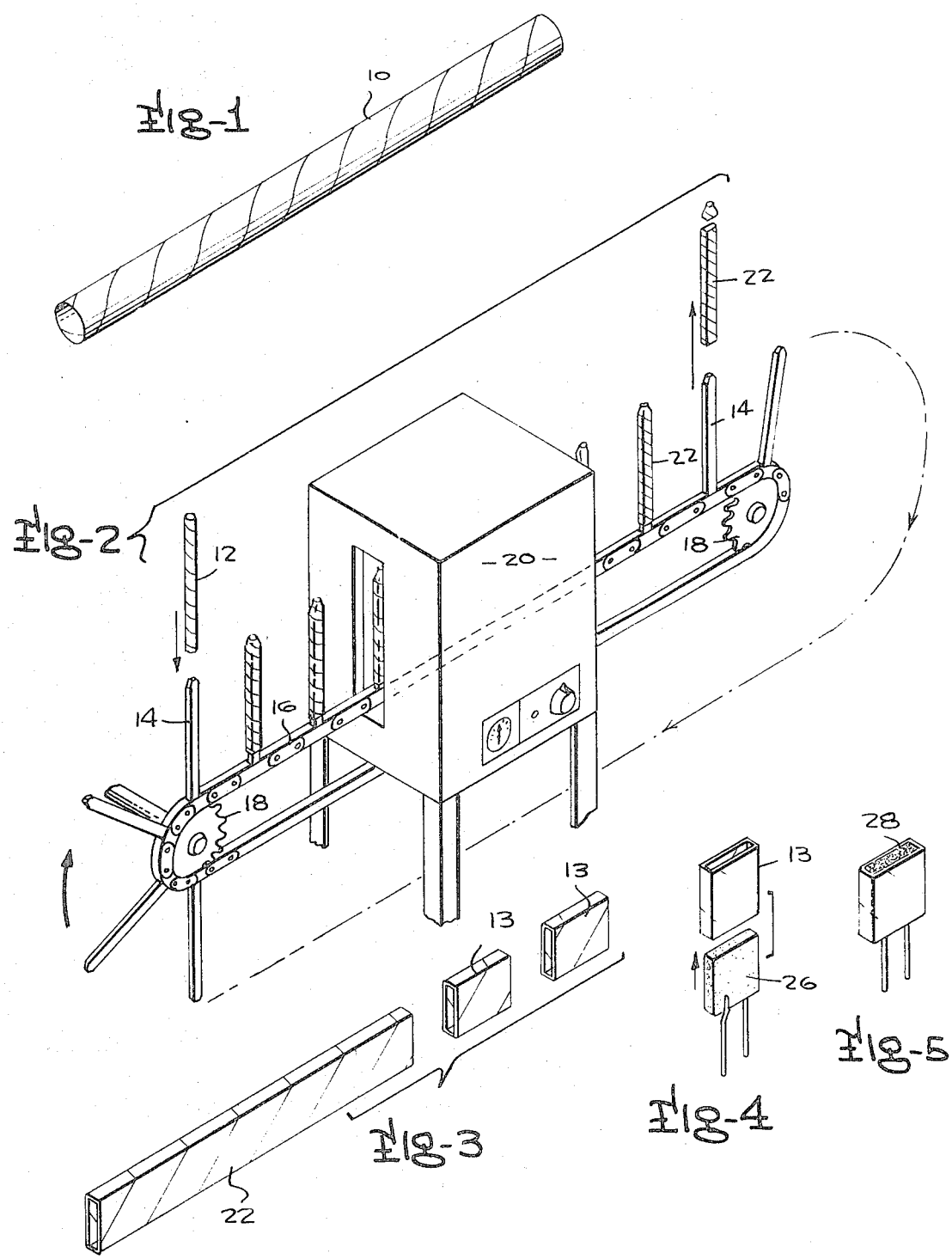

3,775,527
METHOD OF FABRICATING ELECTRICAL
COMPONENT
C. Mills Kinney, Jr., Gaithersburg, and Ronald G. Daringer, Cambridge, Md., assignors to Plastic Tubes Company, division of Multi-Tech, Incorporated, Easton, Md.
Filed June 14, 1971, Ser. No. 152,809
Int. Cl. B29d 7/16
U.S. Cl. 264—159                7 Claims

ABSTRACT OF THE DISCLOSURE

A method of fabricating capacitors and/or capacitor jackets or the like is disclosed in which elongated, uncured thermosetting tube members are placed on male mould members and subjected to heat for shrinking and dimensionally stabilizing the tube members which are subsequently removed from the male mould members and cut to exact lengths to form individual jacket members for receiving internal capacitor sub-components which are sealed in each jacket by an epoxy sealing compound inserted in each end of each jacket for holding the sub-component in position.

---

This invention is in the field of electrical components and is specifically directed to a new and unique method of fabricating small components such as capacitors in which an outer plastic jacket encloses the sub-component capacitor elements which are sealed within the capacitor.

Heat shrinkable tubing formed of a spiral winding of a ribbon-like thermoplastic member bonded in cylindrical tubing form by a polyester adhesive or the like has been used for a substantial time for fabrication into jackets for enclosing small electrical components such as capacitors. Such tubing can be approximately .005 inch thick but variations in thickness of the tubing can occur for different components. The tubing is normally heat shrinkable by an amount varying between 2% to 30% depending upon the exact chemical composition of the particular tube, the temperature to which it is subjected and other variable parameters which are difficult to control. It is imperative that the length of each jacket for the electrical components be as unvarying as possible in order to maintain exact electrical characteristics and to minimize dimensional differences between all of the components.

Prior processes have started with the step of cutting such tubing to a length slightly greater than the finished jacket length; these small pieces are then placed upon individual mould members for shrinkage to what is hoped to be the desired jacket length. This method of fabricating the jackets requires very close tolerances in forming the initial tube in that the inner diameter must be maintained within very small limits in order that the required final jacket length will be achieved. This is true bcause size variations in inner diameter will result in variations in actual shrinkage which are not acceptable.

Moreover, close control must be maintained over the temperature in which the individual jacket members are subjected for shrinkage as well as the time that such members are subjected to the temperature in order that the axial shrinkage of the jacket can be controlled as closely as possible.

Notwithstanding these numerous precautions, a substantial percentage of the jacket members formed by the prior art process exceed the permissible axial length tolerances and must be discarded. Moreover, it has also been found that the cutting of the unshrunk tubing into the lengths slightly greater than the final jacket length frequently results in fraying of the ends of the tubing and a creation of "flags" due to a small amount of unwinding of the end of the ribbon forming the tubing, which unwinding is caused by the heating following the cutting operation.

The foregoing difficulties with the prior known method of assembly have resulted in losses of approximately 30% of the jackets formed thereby due to dimensional irregularities.

Another problem that occurs from the shrinkage of the small unshrunk jacket members on the male mould members is occasioned by virtue of the difficulty of removing such small parts from the mould members due to the fact that shrunken jacket parts frequently stick to the outer surface of the male mandril member.

The subject invention, on the other hand, employs an entirely different method of jacket fabrication in which elongated lengths of the raw tubing which have an axial length which may be dozens of times the axial length of the individual jacket members to be formed therefrom are placed upon elongated mandril members as the initial step in the operation and are shrunk so that their inner opening conforms to the outer surface of the mandril member. The shrunken "elongated" long tube is then removed from the mandril member with the removal being easily accomplished due to the substantial length of the tube member with a minimum of damage occurring to the shrunken tube member.

Following removal of the shrunken long tube from the mandril, it is cut into a large plurality of individual jacket members each of which is at precisely the desired jacket length for fabrication into the electrical component. Since the tube member has been dimensionally stabilized and hardened by the previous heat treatment, and the final axial length of each jacket is the product of a cutting operation—rather than a shrinking operation as has been the case in the past, the jackets are substantially more uniform in length. Following cutting of the shrunken tube into the individual jacket members, the electrical sub-components of the particular component being fabricated are inserted in the jacket members and since the sub-components have a length slightly less than the axial length of each jacket, a space is provided interiorly of each jacket on each end thereof into which epoxy is inserted to provide a sealed-finished component structure.

Therefore, it is the primary object of this invention to provide a new and improved method of making electrical components.

The manner in which the object of this invention is enabled will be better understood when the following written description is considered in conjunction with the attached drawings in which:

FIG. 1 is a perspective view of an uncured tubing member from which component jackets are formed;

FIG. 2 is a perspective view illustrating the second step in operation of the inventive method;

FIG. 3 is a perspective view illustrating the manner in which individual jacket members are cut from a pre-shrunk conventionally stabilized tube member following completion of the step illustrated in FIG. 2;

FIG. 4 illustrates a subsequent step in the assembly of an electrical component; and FIG. 5 illustrates the last step in the assembly resulting in a finished product.

Attention is initially invited to FIG. 1 which illustrates a section of spirally-wound tubing from which electrical component jackets are fabricated by opertion of the subject inventive method. Uncured tubing member 10 is of conventional construction and preferably constitutes an oriented film material such as polyethylene terephthalate, sold under the trademark Mylar by E. I. Du Pont de Nemours and Company, Wilmington, Del. However, other heat shrinkable and stabilized material could be used.

Tubing 10 is heat shrinkable to a limited extent in the range of between 2% and 30% and is formed of a plurality of wound ribbon-like members bonded together by a polyester adhesive. The tubing 10 is completely conventional and can be formed in any conventional manner such as that shown in U.S. Pat. No. 3,279,333 or by other conventional processes. In any event, it should be kept in mind that tubing 10 has the physical characteristic of being permanently shrunk by the application of heat so as to be dimensionally stabilized following such heat application.

The first step in the practice of the inventive method comprises the cutting of uncured tubing 10 into long pieces of uncured tubing 12 as shown in FIG. 2. The long pieces of uncured tubing 12 have an axial length that is a substantial multiple of the final axial length of jackets 13 (FIG. 4) for electrical components to be formed from the uncured tubing.

The long pieces of uncured tubing 12 are placed upon male mould members or mandrils 14 mounted on a travelling chain 16. Chain 16 is supported by a pair of sprocket members 18 which rotate in a direction illustrated by the arrow in FIG. 2 so that the upper flight of chain 16 passes from left to right through a conventional heat supplying curing oven 20 in which the long pieces of uncured tubing 12 are subjected to the application of heat.

The male mould members 14 have a rectangular cross-sectional configuration and the application of heat to the tubing members 12 results in a shrinkage of the tubing members about the mould members 14 so that the tube members 12 are shrunk and dimensionally stabilized in conformity with the outer periphery of the mould members 14. Consequently, the cured tube members 22 exiting from the right portion of oven 20 are of rectangular cross-sectional configuration and have become dimensionally stabilized by virtue of the application of heat in the heat supplying means 20. However, shapes such as triangular, oval and any other shape other than round can be employed by the selection of suitable mould members.

Each of the cured long tube members 22 are respectively removed from the mould members 14 as shown in FIG. 2 and are then cut into a plurality of jackets 13 as shown in FIG. 3. The cutting operation is performed in any convenitonal manner and provides a large number of individual jackets 13 from each of the long cured members 22.

An electrical sub-component such as a capacitor sub-component 26 illustrated in FIG. 4 is matingly inserted inside each of the jacket members 13 as shown in FIG. 4. The sub-component assembly 26 is of slightly less axial length than is the axial length of the jacket members 13 and a cavity is consequently provided on each end of the member 26 surrounded by the outer extent of the jackets 13. This cavity is filled with epoxy as shown at 28 in FIG. 5 on both ends of the jacket so as to sealingly retain the sub-component 26 on the jacket interior.

It should be noted that the fact that the cured elongated member 22 has been dimensionally stabilized by the heat supplied in the heat supplying means 20 provides a completely accurate maintenance of exact lengths for each of the jacket members 13. In addition, the heat treatment of the tubing provides a greater bond between the bonding material and the ribbon forming the tubing members 12 so that the cutting operation following heat treatment does not result in flags caused by separation of the ribbon due to failure of the bonding material along the cut edge.

Variations in the subject invention will occur to those skilled in the art; however, it should be understood that the spirit and scope of this invention should be limited solely by the appended claims.

We claim:

1. A method of fabricating a small electrical member having a closed jacket formed of thermoset material of exact dimensions, said method comprising the steps of providing an unstabilized elongated heat-shrinkable thermosettable tube of length substantially greater than the length of the jacket formed of a wound bonded ribbon wound at an acute angle with respect to said tube, positioning said thermosettable tube matingly over a male mould member, subjecting said elongated thermosettable tube to the application of heat so as to shrink said elongated thermosettable tube and to dimensionally stabilize said tube in the configuration of the male mould member to have a cross-sectional shape defining an internal opening for matingly receiving a small electrical sub-component, dividing said shrunk tube into a plurality of small tube jackets each very closely approaching the same exact length which is slightly greater than the length of said electrical sub-components, matingly positioning one of said electrical sub-components in each of said tube jackets centrally thereof and inserting sealing means in each of said jackets at each end thereof on the interior thereof to seal said electrical sub-component in each of their respective jackets.

2. The method of claim 1 wherein said male mould member is of rectangular cross-sectional configuration.

3. A method of fabricating a jacket for a small electrical component from a heat shrinkable tube formed of thermosettable material in the form of a wound bonded ribbon, said method comprising the steps of providing elongated sections of heat-shrinkable thermosettable tube of substantial length formed of a wound bonded ribbon wound at an acute angle with respect to the axis of said tube which have an axial length that is of substantially greater length than the length of the jackets to be fabricated, placing said thermosettable tube members on individual male mould members, passing said male mould members with said tube members mounted thereon through a heated area to shrink and dimensionally stabilize said tube members to provide cured tube members conforming to the outer configuration of said male mould members, removing said cured tube members from said male mould members and cutting said cured tube members into individual jacket members of a desired length.

4. The invention of claim 3 wherein said male mould member is of rectangular cross-sectional configuration.

5. The invention of claim 1 wherein said thermosettable tube is formed of polyethylene terephthalate.

6. The invention of claim 5 wherein said male mould member is of rectangular cross-sectional configuration.

7. The invention of claim 3 wherein said thermosettable tube is formed of polyethlene terephthalate.

References Cited
UNITED STATES PATENTS

| | | | |
|---|---|---|---|
| 3,185,759 | 5/1965 | Sheehan | 156—191 |
| 3,382,121 | 5/1968 | Sherlock | 264—230 X |
| 2,964,065 | 12/1960 | Haroldson et al. | 264—159 X |
| 3,060,356 | 10/1962 | Beyer | 264—272 X |
| 2,970,182 | 1/1961 | Miquelis | 264—263 X |
| 2,596,134 | 5/1952 | Dorst | 264—263 X |
| 2,720,617 | 10/1955 | Sardella | 264—272 X |

ROBERT F. WHITE, Primary Examiner

T. P. PAVELKO, Assistant Examiner

U.S. Cl. X.R.

156—191, 193, 194, 195; 264—230, 262, 263, 272, Digest 66